(12) United States Patent
Hashimoto et al.

(10) Patent No.: US 11,401,407 B2
(45) Date of Patent: Aug. 2, 2022

(54) RESIN COMPOSITION AND MULTILAYERED STRUCTURE USING SAME

(71) Applicant: MITSUBISHI CHEMICAL CORPORATION, Tokyo (JP)

(72) Inventors: Honoka Hashimoto, Tokyo (JP); Shinji Nakanishi, Tokyo (JP); Kazuya Furukawa, Tokyo (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 210 days.

(21) Appl. No.: 16/400,467

(22) Filed: May 1, 2019

(65) Prior Publication Data

US 2019/0256700 A1 Aug. 22, 2019

Related U.S. Application Data

(63) Continuation of application No. PCT/JP2017/039890, filed on Nov. 6, 2017.

(30) Foreign Application Priority Data

Nov. 9, 2016 (JP) .............................. JP2016-218500

(51) Int. Cl.
| | |
|---|---|
| *C08L 29/04* | (2006.01) |
| *B32B 27/30* | (2006.01) |
| *B32B 27/34* | (2006.01) |
| *C08K 3/26* | (2006.01) |
| *C08K 3/30* | (2006.01) |
| *C08K 5/098* | (2006.01) |
| *C08L 77/02* | (2006.01) |
| *C08L 77/06* | (2006.01) |
| *C08K 3/00* | (2018.01) |
| *C08L 77/00* | (2006.01) |
| *C08K 5/00* | (2006.01) |

(52) U.S. Cl.
CPC ............ *C08L 29/04* (2013.01); *B32B 27/306* (2013.01); *B32B 27/34* (2013.01); *C08K 3/00* (2013.01); *C08K 3/26* (2013.01); *C08K 3/30* (2013.01); *C08K 5/00* (2013.01); *C08K 5/098* (2013.01); *C08L 77/00* (2013.01); *C08L 77/02* (2013.01); *C08L 77/06* (2013.01); *B32B 2307/7246* (2013.01); *B32B 2307/7248* (2013.01); *B32B 2439/70* (2013.01); *C08K 2003/267* (2013.01); *C08K 2003/3063* (2013.01)

(58) Field of Classification Search
CPC .............. Y02P 20/582; C08L 2205/02; C08L 2205/03; C08L 77/00; C08L 77/02; C08L 77/06; C08L 29/04; C08K 2003/267; C08K 2003/3063; C08K 5/00; C08K 5/098; C08K 3/00; C08K 3/26; C08K 3/30; B32B 2439/02; B32B 2439/60; B32B 2439/70; B32B 2307/306; B32B 2307/7244; B32B 2307/7246; B32B 2307/7248; B32B 2307/728; B32B 2307/73; B32B 2307/734; B32B 2272/00; B32B 2270/00; B32B 2250/02; B32B 2250/03; B32B 2250/05; B32B 2250/10; B32B 2250/26; B32B 2250/102; B32B 27/08; B32B 27/20; B32B 27/22; B32B 27/26; B32B 27/288; B32B 27/302; B32B 27/304; B32B 27/306; B32B 27/308; B32B 27/32; B32B 27/322; B32B 27/325; B32B 27/34; B32B 27/36; B32B 25/08; B32B 25/14; B29C 48/022; B29C 48/08; B29C 48/21

See application file for complete search history.

(56) References Cited

U.S. PATENT DOCUMENTS

| | | | |
|---|---|---|---|
| 4,990,562 A | 2/1991 | Chou et al. | |
| 5,064,716 A * | 11/1991 | Chou | C08J 5/18 428/336 |
| 5,126,401 A * | 6/1992 | Chou | B29C 51/14 525/58 |
| 2009/0186233 A1 | 7/2009 | Masumoto et al. | |
| 2012/0128961 A1 | 5/2012 | Yoshida et al. | |
| 2016/0168370 A1 | 6/2016 | Sato | |
| 2016/0215116 A1 | 7/2016 | Kani | |

(Continued)

FOREIGN PATENT DOCUMENTS

| | | |
|---|---|---|
| CN | 105612211 | 5/2016 |
| EP | 0380123 A1 | 8/1990 |

(Continued)

OTHER PUBLICATIONS

Outline of Nylon-MDX6, www.mgc.co.jp/eng/products/nop/nmxd6/about.html, web downloaded Jun. 12, 2014, available Feb. 1, 2001. (Year: 2001).*

(Continued)

*Primary Examiner* — Christopher M Rodd
(74) *Attorney, Agent, or Firm* — Greenblum & Bernstein, P.L.C.

(57) ABSTRACT

Provided is a resin composition comprising an ethylene-vinyl alcohol copolymer (A), a hydrate-forming metal salt (B), and a polyamide-based resin (C) that inhibits elution of a resin composition layer during hot water sterilization treatment of a multilayered structure including the resin composition layer, while suppressing odor during melt molding of the resin composition. An aromatic polyamide (C1) and an aliphatic polyamide (C2) are used for the polyamide-based resin (C) at a proportion of (C1)/(C2)=55/45-99/1.

8 Claims, No Drawings

(56) References Cited

U.S. PATENT DOCUMENTS

| | | | |
|---|---|---|---|
| 2017/0348941 A1 | 12/2017 | Sato et al. | |
| 2018/0015707 A1* | 1/2018 | Kani | ............... B32B 27/08 |
| 2018/0044502 A1 | 2/2018 | Kani | |

FOREIGN PATENT DOCUMENTS

| | | |
|---|---|---|
| EP | 3056538 A1 | 8/2016 |
| JP | 53-49050 | 5/1978 |
| JP | 2-245043 | 9/1990 |
| JP | 4-226553 | 8/1992 |
| JP | 2001-150609 | 6/2001 |
| JP | 2001-151972 | 6/2001 |
| JP | 2009-191255 | 8/2009 |
| JP | 2015-30754 | 2/2015 |
| WO | 2011/027741 | 3/2011 |
| WO | 2015/053176 | 4/2015 |
| WO | 2016/104095 | 6/2016 |
| WO | 2016/163370 | 10/2016 |
| WO | 2016/163407 | 10/2016 |
| WO | WO-2016163407 A1 * | 10/2016 ............. B32B 27/08 |

OTHER PUBLICATIONS

Extended European Search Report issued in EP Application No. 17869723.1 dated May 26, 2020.
International Search Report issued in International Patent Application No. PCT/JP2017/039890, dated Jan. 23, 2018.
IPRP issued in International Patent Application No. PCT/JP2017/039890, dated May 14, 2019 English translation.
Notice of Reasons for Refusal, Japanese Patent Application No. 2017-559127, dated Aug. 17, 2021, English translation.
1$^{st}$ Office Action issued in CN Patent Application No. 201780068519.5, dated Mar. 25, 2021, English translation.
Communication under Article 94(3) issued in EP Patent Application No. 17 869 723.1-1107, dated Sep. 28, 2021.
Decision of Rejection in corresponding CN Patent App. No. 201780068519.5, translation dated Jan. 19, 2022 along with its English translation.

* cited by examiner

RESIN COMPOSITION AND MULTILAYERED STRUCTURE USING SAME

CLAIM FOR PRIORITY

This application is a Continuation of PCT/JP2017/039890 filed Nov. 6, 2017, and claims the priority benefit of Japanese application 2016-218500 filed Nov. 9, 2016, the contents of which are expressly incorporated by reference herein in their entireties.

TECHNICAL FIELD

The present invention relates to a resin composition comprising ethylene-vinyl alcohol-based copolymer (hereinafter, referred to as "EVOH resin"), and a multilayered structure using the same. In more detail, the present invention relates to a resin composition which has a reduced odor in melt molding of the resin composition and is resistant to elution of the EVOH resin when the multilayered structure containing a layer of the resin composition is subjected to hot water sterilization treatment.

BACKGROUND

EVOH resin includes a crystal part due to strong hydrogen bonds between hydroxyl groups in a molecular chain thereof. Since the crystal part can inhibit the intrusion of oxygen from the outside, the EVOH resin exhibits excellent gas barrier property including oxygen barrier performance. For this property, a multilayered film containing a layer of EVOH resin as a gas barrier layer is utilized for a packaging film for food or the like. However, when a package which employs a multilayered film comprising the EVOH resin film as the gas barrier layer is subjected to hot water sterilization treatment, the gas barrier performance of the package is known to be deteriorated. The hot water sterilization treatment is a retort sterilization treatment or boiling sterilization treatment, where the package is exposed to hot water for a long time. During the hot water sterilization treatment, moisture intrudes into the EVOH resin layer from the edge of the multilayered film or the like, which results in breaking the hydrogen bond between molecules in the EVOH resin and allowing oxygen to penetrate easily into the EVOH resin layer from the outside. Thus the gas barrier performance of the multilayered structure is deteriorated.

There is a known method for suppressing the deterioration of gas barrier performance caused by a hot water sterilization treatment (for example, patent document 1). In the method, the deterioration is inhibited by blending a complete or partial dehydrate of polyvalent metal sulfate hydrate as a desiccant with EVOH resin. The complete or partial dehydrate of polyvalent metal sulfate hydrate has a property of trapping water molecules as water of crystallization. Based on such properties of the desiccant, moisture intruded into the EVOH resin layer during the hot water sterilization treatment is absorbed and is trapped as water of crystallization in the desiccant, which results in preventing the collapse of hydrogen bonds between molecules. By such action of the desiccant, the deterioration of gas barrier performance due to the hot water sterilization treatment is suppressed.

However there is another problem that blisters are generated between an EVOH resin composition layer and its adjacent layer when a multilayered structure comprising the EVOH resin composition layer is left under high temperature and high humidity condition for a long period, the EVOH resin composition containing a complete or partial dehydrate of polyvalent metal sulfate hydrate for a desiccant. The cause of the generation of blister was proved that when a polyvalent metal sulfate was left for a long term under high temperature and high humidity condition, the polyvalent metal sulfate absorbed excess moisture due to its deliquescence property and finally dissolved itself in the moisture. Under such circumstances, a patent document 2 suggests a technique for suppressing deterioration of gas barrier performance while avoiding the occurrence of blisters after a hot water sterilization treatment. The technique is made by adding a hydrate-forming alkaline earth metal salt to a resin composition wherein the hydrate-forming alkaline earth metal salt has a moderate water absorption receptivity.

In the document, complete or partial dehydrate of an alkaline earth metal salt of an acid selected from the group consisting of lactic acid, silicic acid, phosphoric acid, and citric acid are specifically listed as the hydrate-forming alkaline earth metal salt.

PRIOR ART

Patent Document

Patent Document 1: WO2011/027741
Patent Document 2: WO2015/053176

SUMMARY OF THE INVENTION

Technical Problem to be Solved by the Invention

By the way, the patent documents 1 and 2 further suggested that a polyamide-based resin was admixed for the purpose of avoiding the elution of EVOH resin by the hot water sterilization treatment.

However, a new problem associated with a resin composition containing EVOH resin and a hydrate-forming metal salt was found. The problem was the occurrence of offensive odor when the resin composition was melt kneaded or melt-molded. The offensive odor is not occurred in the case of a resin composition not containing a polyamide-based resin. The offensive odor is unpleasant odor for people who handles the resin composition, and therefore reducing the offensive odor is required.

Means for Solving the Problem

Since the problematic odor is occurred in the case of a resin composition containing a polyamide-based resin, the cause of the offensive odor may be relevant to a polyamide-based resin. The inventor has studied a variety of polyamide-based resins.

As a result of investigation, the inventor has found that the offensive odor can be reduced in the case of employing, for the polyamide-based resin, a polyamide-based resin whose main chain includes a structural unit containing an aromatic ring. However, the inventor found EVOH resin eluted from the resin composition containing the polyamide-based resin whose main chain includes a structural unit containing an aromatic ring when a multilayered structure containing a layer of the resin composition is subjected to a hot water sterilization treatment. This means we do not gain an expected effect of the addition of the polyamide resin.

The inventor has further studied and found that a specific content ratio of an aromatic polyamide-based resin to an aliphatic polyamide-based resin in the polyamide-based resin make it possible to reduce the generation of offensive odor during melt molding while preventing the elution of the EVOH resin during a hot water sterilization treatment. Thus the present invention has been completed.

A resin composition of the invention comprises an ethylene-vinyl alcohol copolymer (A), a hydrate-forming metal salt (B), and a polyamide-based resin (C). The polyamide-based resin (C) comprising (C1) an aromatic polyamide-based resin whose main chain includes a structural unit containing an aromatic ring, and (C2) aliphatic polyamide-based resin whose main chain includes an aliphatic hydrocarbon containing 5 or more carbon atoms. And the content ratio of the aromatic polyamide-based resin (C1) to the aliphatic polyamide-based resin (C2), (C1)/(C2), is from 55/45 to 99/1.

Preferably the resin composition further contains a dispersant (D).

In another aspect of the invention, a multilayered structure comprising at least one layer made from a resin composition of the invention is also provided.

Effect of the Invention

As for the resin composition of the invention, the occurrence of odor during melt molding may be suppressed and the deterioration of gas barrier performance may also be suppressed. Moreover the elution of EVOH reins is prevented even when a multilayered structure including a layer of the resin composition is subjected to a hot water sterilization treatment.

EMBODIMENT FOR CARRYING OUT THE INVENTION

The present invention is described in detail below, and these are merely examples of desirable embodiments and are not intended to limit thereto.

<Resin Composition>

A resin composition of the invention comprises an ethylene-vinyl alcohol copolymer (A), a hydrate-forming metal salt (B), and a polyamide-based resin (C). The polyamide-based resin (C) comprises (C1) an aromatic polyamide-based resin whose main chain including a structural unit containing an aromatic ring, and (C2) aliphatic polyamide-based resin whose main chain including aliphatic hydrocarbon containing 5 or more carbon atoms. And a content ratio of the aromatic polyamide-based resin (C1) to the aliphatic polyamide-based resin (C2), (C1)/(C2), is from 55/45 to 99/1.

Each component will be described below
[(A) EVOH Resin]

An ethylene-vinyl alcohol copolymer (EVOH resin) is also called as a saponified ethylene-vinyl ester-based copolymer. EVOH resin is an insoluble thermoplastic resin commonly produced by saponifying an ethylene-vinyl ester-based copolymer which is a copolymer of ethylene and a vinyl ester-based monomer.

Vinyl acetate is typically used as the vinyl ester-based monomer due to its market availability and high efficiency of removing impurity at the time of production. Other vinyl ester-based monomers may also be used. Examples of the other vinyl ester-based monomers include aliphatic vinyl esters such as vinyl formate, vinyl propionate, vinyl valerate, vinyl butyrate, vinyl isobutyrate, vinyl pivalate, vinyl caprylate, vinyl laurate, vinyl stearate and vinyl versatate; and aromatic vinyl ester such as vinyl benzoate and the like. Aliphatic vinyl ester having usually 3-20 carbon atoms, preferably 4-10 carbon atoms, particularly preferably 4-7 carbon atoms, may be used. These are usually used alone, but a combination of a plurality of vinyl ester-based monomers may be used if necessary.

The copolymerization of ethylene and a vinyl ester-based monomer may be carried out by any polymerization method known in the art, for example, solution polymerization, suspension polymerization, or emulsion polymerization. In general, a solution polymerization using methanol as the solvent is employed. Saponification of the obtained ethylene-vinyl ester copolymer may also be carried out by a known method.

Thus produced EVOH resin contains a structural unit derived from ethylene monomer and a vinyl alcohol structural unit, both of which are main units, and contains a slight amount of a vinyl ester structural unit as an unsaponified unit.

The content of the ethylene structural unit in the EVOH resin is from usually 20 to 60 mol %, preferably 25 to 50 mol %, and particularly preferably 25 to 35 mol %, as a value measured in accordance with ISO 14663. When the content is too low, the gas barrier performance and melt moldability under high humidity tend to be deteriorated, on the contrary, when the content is too high, the gas barrier performance tends to be insufficient.

The degree of saponification of the vinyl ester component in the EVOH resin is from usually 90 to 100 mol %, preferably 95 to 100 mol %, and particularly preferably 99 to 100 mol % as a value determined by JIS K6726 with respect to a solution in which EVOH resin is dissolved in water/methanol mixed solvent. When the degree of saponification is too low, the gas barrier performance, thermal stability, moisture resistance, and the like tend to be deteriorated.

A melt flow rate (MFR) of EVOH resin (210° C., loading of 2160 g) is from usually 0.5 g/10 min. to 100 g/10 min., preferably 1/10 min. to 50 g/10 min., particularly preferably 3 g/10 min. to 35 g/10 min. When the MFR is too large, film formation property tends to become unstable. When the MFR is too small, the viscosity becomes too high, and therefor melt extrusion tends to be difficult.

The EVOH resin used in the invention may further contain a structural unit derived from a comonomer shown in below within the range not inhibiting the effect of the invention (for example, 10 mol % or less).

The comonomers include olefins such as propylene, 1-butene, and isobutene; hydroxyl group-containing alpha-olefins such as 3-butene-1-ol, 3-butene-1,2-diol, 4-pentene-1-ol, and 5-hexene-1,2-diol, and esterified product thereof such as 3,4-diacetoxy-1-butene, 2,3-diacetoxy-1-allyloxypropane, or 2-acetoxy-1-allyloxy-3-hydroxypropane, 3-acetoxy-1-allyloxy-2-hydroxypropane; hydroxymethylvinylidene such as 1,3-hydroxy-2-methylenepropane, and 1,5-hydroxy-3-methylenepentane, and esterified product thereof such as 1,3-diacetoxy-2-methylenepropane, 1,3-dipropionyloxy-2-methylenepropane, and 1,3-dibutylonyloxy-2-methylenepropane; glycerin monounsaturated alkyl ethers such as glycerin monoallyl ether, glycerin monovinyl ether, glycerin monoisopropenyl ether and a like methylvinylidene diacetate; unsaturated acids such as acrylic acid, methacrylic acid, crotonic acid, (anhydrous) phthalic acid, (anhydrous) maleic acid, (anhydrous) itaconic acid or a salt thereof, and mono- or di-alkyl (having from 1 to 18 carbon atoms) ester; acrylamides such as acrylamide, N-alkylacrylamide having 1 to 18 carbon atoms, N,N-dimethylacrylamide, 2-acrylamide propanesulfonic acid, acrylamide-2-methylpropanesulfonic acid or salt thereof, acrylamidepropyl dimethylamine or an acid salt thereof or a quaternary salt thereof, methacrylamides such as methacrylamide, N-alkylmethacrylamide having 1 to 18 carbon atoms, N,N-dimethylmethacrylamide, 2-methacrylamidopropane sulfonic acid or its salt, and methacrylamidopropyl dimethylamine or its acid salt or a quaternary salt thereof, N-vinyl amides such as N-vinylpyrrolidone, N-vinylformamide, N-vinylacetamide or the like; a vinyl cyanide such as acrylonitrile and methacrylonitrile; vinyl ethers such as alkylvinyl ether, hydroxyalkyl vinyl ether, and alkoxyalkyl vinyl ether (wherein each alkyl has from 1 to 18 carbon atoms); halogenated vinyl compounds such as vinyl chloride, vinylidene chloride, vinyl fluoride, vinylidene fluoride, and vinyl bromide; vinylsilanes such as trimethoxyvinylsilane; halogenated allyl compound such as allyl acetate and allyl chloride; allyl alcohols such as allyl alcohol and dimethoxyallyl alcohol; and trimethyl-(3-acrylamido-3-dimethylpropyl)-ammonium chloride.

A "post-modified" EVOH-based resin obtained by urethanated, acetalized, cyanoethylated, or oxyalkylated may be used.

As the modified EVOH resin, an EVOH resin in which a primary hydroxyl group is introduced into a side chain of the EVOH resin by copolymerization, in particular, an EVOH resin having a 1,2-diol structure in a side chain thereof, is preferably used from the viewpoint of excellent formability in stretching treatment or vacuum/pressure forming.

The EVOH resin used in the invention may be a mixture of EVOH resins which differ in a structure including structural unit derived from comonomer, saponification degree, or polymerization degree.

The EVOH resin used in the invention may contain an additive which is commonly used for EVOH resin unless the additive inhibits the effect of the invention. Examples of the additive include heat stabilizer, antioxidant, antistatic agent, colorant, ultraviolet absorber, lubricant, plasticizer, light stabilizer, surfactant, antibacterial agent, desiccant, antiblocking agent, flame retardant, crosslinking agent, curing agent, foaming agent, nucleating agent, antifogging agent, additive for biodegradability, silane coupling agent, and oxygen absorbent.

[(B) Hydrate-Forming Alkaline Earth Metal Salt]

A hydrate-forming metal salt (B) used in the invention is a metal salt having a property that water molecules are trapped as water of crystallization.

Examples of the metal as a constituent of the metal salt include alkali metals such as potassium and sodium; alkali earth metals such as magnesium and calcium, and transition metals such as aluminum, zinc, nickel, iron and manganese.

The anionic constituent of the metal salt includes inorganic acids such as phosphoric acid, carbonic acid, sulfuric acid, hydrochloric acid, boric acid, nitric acid and silicic acid; and organic acids including carboxylic acids such as oxalic acid, lactic acid, citric acid, benzoic acid, cyclopropanedicarboxylic acid, and sulfonic acid. As the carboxylic acid, a carboxylic acid having 2 to 15 carbon atoms is preferable, and an aliphatic carboxylic acid having 2 to 6 carbon atoms is particularly preferable from the viewpoint of economy.

Any metal salt as a combination of the metal and acid selected from the above list may be used as long as the metal salt is able to form a hydrate.

Specific examples of the inorganic acid salt include sulfate (e.g. magnesium sulfate [heptahydrate] etc.), silicate (e.g. magnesium silicate [pentahydrate]), phosphate (e.g. trimagnesium phosphate [octahydrate]), carbonate (e.g. basic magnesium carbonate [heptahydrate], sodium carbonate [decahydrate]), and so on. Specific examples of organic acid salt include succinate (e.g. disodium succinate [hexahydrate]), lactate (e.g. calcium lactate [pentahydrate]), citrate (e.g. trisodium citrate [dihydrate], calcium citrate [tetrahydrate], and trimagnesium dicitrate [tetradecahydrate], magnesium hydroxycitrate [pentahydrate]) and a like carboxylate. The term in brackets indicates the hydrate incorporating a maximum number of water molecules. These hydrate-forming metal salts, or complete or partial dehydrate of the metal salt hydrate have a property of trapping water molecules.

The hydrate-forming metal salt used in the invention is a metal salt such that a hydrate having a hydration number of usually 1 to 20, preferably 3 to 18, particularly preferably 5 to 15, retains in its stable state. In a case that a hydrate of the metal salt in a stable state has a relatively small number of water of crystallization, the metal salt tends to have lower receptivity from the water intruded.

Anhydrous or partial dehydrated compound of hydrated metal salt incorporating the maximum number of water molecules may be used for a hydrate-forming metal salt (B). The anhydrous compound contains no water of crystallization. The partially dehydrated compound contains water of crystallization but the amount of the water is less than that of the hydrate in a stable state. A partially dehydrated or partially hydrated one generally contains water of crystallization less than 70%, preferably 50% or less, more preferably 10% or less, based on the amount of water of crystallization contained in the hydrate in which the maximum hydration number of water molecules is trapped.

Anhydrate or partial hydrate which is employed as the hydrate-forming metal salt (B) may be produced by completely or partially dehydrating a metal salt hydrate. Alternatively a commercially available alkaline earth metal salt (anhydrous) or partial hydrate may be used.

Such hydrate-forming metal salt may be used alone or in combination of two or more. A mixture of an anhydrate and a partial hydrate may be used, and a mixture of different kinds of metal salts may also be used.

The hydrate-forming metal salt (B) used for the invention satisfies at least one water absorption property selected from the group consisting of (I), (II) and (III), preferably satisfies all of the water absorption properties.

Water Absorption Property (I):

The ratio ($X_5/Y$) is in the range of 0.2 or more, preferably 0.2 to 10.0, more preferably 0.5 to 5.0, particularly preferably 0.75 to 2.0, wherein Y is an amount of water of crystallization contained in a hydrated hydrate-forming metal salt (B) in a state of maximum hydration, and $X_5$ is an amount of water absorption per 100 g of hydrate-forming metal salt (B) when the hydrate-forming metal salt (B) is placed for 5 days under the condition of 40° C. and 90% relative humidity.

The amount of water of crystallization contained in the hydrate in a state of maximum hydration, Y (g), is an amount of water which is able to be trapped in 100 g of hydrate-forming metal salt with no water of crystallization. Such an amount of water of crystallization (Y) is a specific value depending on type of metal salt and calculated by the formula below.

$$Y\text{ (g)}=[\text{hydration number of hydrate in a state of maximum hydration}\times 18]/(\text{molecular weight of anhydrate})]\times 100$$

The amount of water of crystallization (Y) in the hydrate in a state of the maximum hydration corresponds to an amount of water contained in the hydrated hydrate-forming metal salt in a state of maximum hydration. Therefore the amount Y may become an indicator for the maximum amount of water absorbed by metal salt (anhydrous) used as the component (B), as well as an indicator for an amount of water which may be trapped from the water intruded into EVOH resin. When the amount of the water which the metal salt may trap from the water intruded into EVOH resin is increased, the amount of oxygen which can penetrate in the multilayered structure after the hot water sterilization is suppressed. Accordingly the higher Y is the better. Y is usually 10 g or more, preferably 30 g or more, particularly 50 g or more. On the other hand, the state of maximum hydration of the hydrate-forming metal salt is not always the most stable state. The hydrate retaining in the most stable state, i.e. most stable hydrate sometimes has less water of crystallization than the hydrate in a state of maximum hydration. For example, regarding trimagnesium dicitrate, nonahydrate is the most stable state in spite that tetradecahydrate is a state of maximum hydration.

The amount of water absorption ($X_5$) is an amount of water absorption (unit: g) per 100 g of hydrate-forming metal salt (B) when a dehydrate of the hydrate-forming metal salt (anhydrous) is placed for 5 days under the condition of 40° C. and 90% relative humidity. $X_5$ is calculated by the following formula.

$$X_5=[(\text{weight of water absorbed for 5 days})/(\text{initial weight})] \times 100$$

In the above formula, the "weight of water absorbed for 5 days" is calculated by subtracting the initial weight from the weight at 5th day from the beginning of the examination. The "initial weight" is a weight of metal salt before being used. The "initial weight" and "weight of water absorbed for 5 days" are values measured actually. These weights can be obtained by weighing with mass measuring instrument such as electronic scales. Those values depend on types of metal salt as well as manufacturing method, incorporating or not incorporating water of crystallization, chemical condition, and the like.

In the case of using anhydrous hydrate-forming metal salt as the component (B), theoretical water content should be 0 g. However the initial weight is a measurement value at the equilibrium condition with use of thermogravimetric analyzer ("Pvris 1 TGA" from Perkin Elmer Co., Ltd.) or the like analyzer. The gained weight includes a trace amount of moisture but the weight is employed as a weight of a completely dehydrated compound in the formula.

The actual amount of water may be determined with use of, for example, a thermogravimetric analyzer ("Pyris 1 TGA" from Perkin-Elmer Co. Ltd). Thus determined amount is an amount of water contained in the entire compound, which can be calculated as an amount contained in the compound which reaches the weight equilibrium.

The amount of water absorption per 100 g, $X_5$, is usually from 10 to 400 (g), preferably from 20 to 200 (g), particularly preferably from 30 to 75 (g). A hydrate-forming metal salt having a relatively high value of $X_5$ (amount of water absorption) tends to trap moisture in excessive amount in forming its stable hydrate. For this reason, when a multilayered structure containing such a hydrate-forming metal salt is placed under a high humidity condition, the appearance tends to be impaired. On the other hand, a hydrate-forming metal salt having a relatively low value of $X_5$ may absorb slight amount of moisture from the water intruded into a resin composition. For this reason, a multilayered structure containing such a hydrate-forming metal salt tends to exhibit insufficient gas-barrier performance after a hot water sterilization treatment.

$X_5/Y$ is a ratio of the amount of water absorption ($X_5$) to the amount of water of crystallization (Y). The ratio indicates a proportion of water amount absorbed for 5 days to the water amount which is stably retained by a hydrate-forming metal salt used as the component (B). A metal salt having an extremely small ratio exhibits poor formation of hydrate and poor receptivity of moisture, which may result in insufficient gas barrier performance after hot water sterilization treatment. For this reason, the ratio is set at 0.2 or more, preferably from 0.2 to 10. On the other hand, $X_5/Y$ may be an indicator relating to occurrence of blister in a multilayered structure when the multilayered structure is placed under high humidity conditions. A metal salt having a high value of $X_5/Y$ exhibits rich receptivity of moisture, and therefore the metal salt can remarkably suppress the deterioration of gas barrier performance caused by the intrusion of moisture. However, the amount of water which such metal salt traps is so large that a hydrate-forming metal salt may not maintain its stable state, resulting in generation of blister. From the viewpoint of preventing the occurrence of blister in a multilayered structure when it is placed under high temperature and high humidity for a long period, $X_5/Y$ is set to the range of 0.5 to 5.0 (exclusive), and preferably the range of 0.75 to 2

Water absorption property (II): an amount of water absorbed while being placed for 24 hours under the condition of 40° C. and 90% relative humidity. Z, is 10 g or more, preferably 50 g or more, more preferably 80 g or more, particularly preferably 100 g or more. The amount (Z) corresponds to an initial speed of water absorption.

Z is expressed as an amount (unit: g) of water that 100 g of hydrate-forming metal salt (B) absorbs while being placed for 24 hours under the condition of 40° C. and 90% relative humidity.

The capacity of water of the metal salt having a relatively low Z as the initial speed of water absorption is insufficient when taking into consideration the amount of water intruded into a resin composition. As a result, gas barrier performance after the hot water sterilization treatment would be impaired.

Water absorption property (III): a local maximum point exists in the amount of water absorption when the metal salt is placed under the condition of 40° C. and 90% relative humidity.

The local maximum point is a turning point for changing to decreasing tendency in an amount of water absorption while being placed for 6 days under high-temperature and high-humidity condition such as 40° C. and 90% relative humidity. Specifically if the local maximum point exists in the measurement of the water absorption amount (X) every 24 hours while being placed, Xn is smaller than $X_{n+1}$ wherein Xn and $X_{n+1}$ are amounts of water absorption at n-th day and the next day ((n+1)-th day) respectively. The amount of water absorption at n-th day (Xn) is determined by the calculation: (weight at n-th day)–(initial weight).

Accordingly the water absorption property (III) indicates a property that hydrate-forming metal salt absorbs water up to the local maximum point and then discharge a part of water once trapped. This means that the hydrate-forming metal salt can suppress excessive water absorption after absorbing a proper amount of water. According to the water absorption property (III), hydrate-forming alkaline earth metal salt (B) can avoid deliquesce in water absorbed by itself. If a stable hydrate of a hydrate-forming metal salt has a hydration number lower than the maximum hydration number, the hydrate-forming metal salt absorbs water up to a state having the maximum hydration number and thereafter discharges water once absorbed to attain the stable state. Thus the amount of water absorption seems to be adjusted.

A hydrate-forming metal salt (B) satisfying at least one selected from the aforementioned water absorption properties (I), (II), and (III), preferably satisfying all of the water absorption properties, may contribute to suppress the occurrence of blister at the lamination interface in a multilayered structure where a layer of the inventive resin composition is sandwiched by a hydrophobic resin layer.

Accordingly if a hydrate-forming metal salt satisfying the water absorption properties (I), (II), and/or (III) is used as a desiccant, an deterioration of gas barrier performance due to a hot water sterilization treatment may be prevented. In addition, the hydrate-forming metal salt can avoid absorbing extra water beyond their moisture receptivity, or discharge extra water after absorbing excessive amount of moisture to attain the stable state. As a result, even when the multilayered structure is exposed to high-temperature and high-humidity condition for long hours, the multilayered structure can avoid impairing appearance and keep an excellent appearance.

Hydrate-forming metal salt satisfying the aforementioned water absorption properties (I), (II), and/or (III) includes, for instance, a complete dehydrate (anhydrate) or partial dehydrate of an alkaline earth metal salt of citric acid such as magnesium citrate, trimagnesium dicitrate or the like, and complete dehydrate (anhydrate) or partial dehydrate of magnesium silicate and trimagnesium phosphate. In the case of partially dehydrate, as described above, the amount of water of crystallization contained therein is less than 70% of amount in a state of maximum hydration, preferably 50% or less, and more preferably 10% or less. Among these, completely dehydrated product of magnesium citrates such as magnesium citrate and trimagnesium dicitrate is preferably used.

A common hydrate-forming alkaline earth metal salt (B) is in the form of powder, which has a particle-size distribution of 50 volume % or more, preferably 80 volume % or more, particularly preferably 95 volume % or more of particles passing through 120 mesh screen, in terms of determining according to ASTM E11-04. The particle-size distribution provides an indication of dispersibility in EVOH resin. The higher percentage of particles passing through 120 mesh screen indicates excellent in dispersibility. Unduly low percentage of particles passing through 120 mesh screen tends to impair appearance of the final multilayered structure.

[(C) Polyamide-Based Resin]

An amide bond in a polyamide-based resin may interact with an OH group and/or an ester group of an EVOH resin to form a network structure, and thereby preventing the elution of the EVOH resin during the hot water sterilization treatment.

A polyamide-based resin (C) contained in the resin composition employs (C1) an aromatic polyamide resin whose main chain includes a structural unit containing an aromatic ring (hereinafter, simply referred to as "aromatic polyamide-based resin (C1)") and (C2) an aliphatic polyamide-based resin whose main chain includes an aliphatic hydrocarbon chain containing 5 or more carbon atoms (hereinafter simply referred to as "aliphatic polyamide-based resin (C2)"). The amount of the aromatic polyamide resin (C1) in the polyamide-based resin (C) is more than half, which is a feature of the invention. The polyamide-based resin (C) is a combination of an aromatic polyamide-based resin (C1) and an aliphatic polyamide-based resin (C2).

(C1) Aromatic Polyamide-Based Resin

An aromatic polyamide-based resin (C1) comprises a main chain which includes a structural unit containing an aromatic ring. The structural unit containing an aromatic ring may be any one of diamine unit and a dicarboxylic acid unit which are constituents of the polymer.

Examples of the aromatic diamine for supplying the diamine unit include p-phenylenediamine, meta-phenylenediamine, benzidine, orthoxylylenediamine, metaxylylenediamine, paraxylylenediamine, 4,4'-diaminodiphenyl ether, 3,4'-diaminodiphenyl ether, 4,4'-diaminodiphenylmethane, 4,4'-diaminodiphenylsulfone, 3,3'-dimethyl-4,4'-diaminodiphenylmethane, 1,5-diaminonaphthalene, 3,3'-dimethoxybenzidine, 1,4-bis(3-methyl-5-aminophenyl)benzene and the like. Among them, orthoxylylenediamine, meta-xylylenediamine and para-xylylenediamine are preferred, and meta-xylylenediamine and para-xylylenediamine are more preferred.

Examples of the aromatic dicarboxylic acid for supplying the dicarboxylic acid unit include phthalic acids such as ortho-phthalic acid, terephthalic acid and isophthalic acid; hydroxy phthalic acids such as hydroxyisophthalic acid, hydroxyterephthalic acid, dihydroxyisophthalic acid and dihydroxyterephthalic acid; polyaromatic carboxylic acids such as biphenyldicarboxylic acid and naphthalenedicarboxylic acid; aromatic alkyl carboxylic acids such as benzene diacetic acid and benzene dipropionic acid; oxydibenzoic acid, thiodibenzoic acid, dithiodibenzoic acid, dithiobis (nitrobenzoic acid), carbonyldibenzoic acid, sulfonyldibenzoic acid methylenedibenzoic acid, isopropylidenedibenzoic acid or the like. Among them, phthalic acid is preferred, in particular, terephthalic acid and isophthalic acid are preferred.

A chloride compound may be used instead of the aromatic dicarboxylic acid for supplying the aromatic dicarboxylic acid unit. Examples of the aromatic dicarboxylic acid dichloride includes terephthalic acid chloride, isophthalic acid chloride, 1,4-naphthalenedicarboxylic acid chloride, 2,6-naphthalenedicarboxylic acid chloride, 4,4'-biphenyldicarboxylic acid chloride, 5-chloroisophthalic acid chloride, 5-methoxyisophthalic acid chloride, and bis(chlorocarbonylphenyl) ether.

The aromatic polyamide-based resin (C1) is used in the invention may include a structural unit containing an aliphatic hydrocarbon chain in its main chain.

As the aliphatic diamine for supplying a structural unit of the aliphatic hydrocarbon chain, a straight-chain aliphatic diamine having 2 to 18 carbon atoms such as methylenediamine, 1,3-propylenediamine, tetramethylenediamine, pentamethylenediamine, hexamethylenediamine, heptmethylenediamine, octamethylenediamine, nonamethylenediamine, decamethylenediamine, undecamethylenediamine, dodecamethylenediamine and the like; alicyclic diamine such as 1,3-diaminocyclohexane and 1,4-diaminocyclohexane; and aliphatic diamines other than straight-chain aliphatic diamine such as N-methylethylenediamine, 2-methyl-1,5-pentanediamine, and 1-amino-3-aminomethyl-3,5,5-trimethylcyclohexane. Among these, aliphatic diamines having 5 or less carbon atoms are preferable from the viewpoint of preventing offensive odor.

As the aliphatic dicarboxylic acid for supplying a structural unit of an aliphatic hydrocarbon chain, any one of linear aliphatic dicarboxylic acid, alicyclic dicarboxylic acid, and branched aliphatic dicarboxylic acid may be used. For example, oxalic acid, malonic acid, fumaric acid, maleic acid, succinic acid, glutaric acid, adipic acid, pimelic acid, suberic acid, azelaic acid, sebacic acid, 1,10-decanedicarboxylic acid, 1,11-undecanedicarboxylic acid, 1,12-dodecanedicarboxylic acid, or cyclopentanedicarboxylic acid may be used. Of these, from the viewpoint of preventing the offensive odor, a linear aliphatic dicarboxylic acid having 4 or less carbon atoms in the aliphatic hydrocarbon chain is preferred.

As the aromatic polyamide-based resin (C1) used in the invention, the percentage of the aromatic group-containing unit per all structural units (i.e. all monomer units) in the polyamide-based resin (C1) may be 30 mol % or more. Accordingly a semi-aromatic polyamide synthesized from a combination of an aromatic diamine and an aliphatic dicarboxylic acid or a combination of an aromatic dicarboxylic acid and an aliphatic diamine as well as a wholly aromatic polyamide synthesized from an aromatic diamine and an aromatic dicarboxylic acid may be used as the aromatic polyamide-based resin (C1) used in the invention. The semi-aromatic polyamide is preferably used from the viewpoint of compatibility with the EVOH resin (A).

In an ordinal semi-aromatic polyamide, a percentage of a structural unit containing an aromatic ring in the main chain is 50% by mol based on the total structural units (all monomer units) of the polyamide-based resin. A part of the aromatic dicarboxylic acid or the aromatic diamine may be substituted with aliphatic dicarboxylic acids or aliphatic diamines respectively.

Therefore, an aromatic polyamide-based resin (C1) preferably used in the invention comprises a main chain including a structural unit which contains aromatic ring at a proportion of usually 30 to 60%, preferably 40 to 55% by mol based on all structural units (all monomer units) thereof.

Examples of the aromatic polyamide-based resin (C1) used in the invention includes a wholly aromatic polyamide which is a copolymer of phenylenediamine and phthalic acid, poly-p-phenylene terephthalamide, and poly(p-phenylene/3,4'-diphenyl ether terephthalamide); semi-aromatic polyamide such as polymeta-xylylene adipamide, polymeta-xylylene sebacamide, polymeta-xylylene dodecanamide, poly-para-xylylene sebacamide, polyhexamethylene isophthalamide, polyhexamethylene terephthalamide, polymeta-xylylene adipamide, and hexamethylene isophthalamide/terephthalamide copolymer. From the viewpoint of preventing offensive odor, an aliphatic hydrocarbon structural unit in the main chain preferably contains 4 or less carbon atoms (wherein the carbon atom contained in amide bond (—CONH—) is no longer counted in, which is similarly applied hereinafter), and therefore polymeta-xylylene adipamide is particularly preferably used.

(C2) Aliphatic Polyamide-Based Resin

The aliphatic polyamide-based resin (C2) is a polyamide-based resin whose main chain includes an aliphatic hydrocarbon unit containing 5 or more carbon atoms at a proportion of 70 mol % or more.

For a compound which supplies a structural unit having an aliphatic hydrocarbon chain having 5 or more carbon atoms to the main chain, a lactam capable of achieving the supply (e.g. caprolactam, undecane lactam, lauryl lactam, etc.) may be used. The above-listed aliphatic diamine and aliphatic dicarboxylic acid which supplies a unit containable in the aromatic polyamide-based resin (C1) may also be used.

Further, an alicyclic diamine (e.g. 1,3-diaminocyclohexane, 1,4-diaminocyclohexane) and an alicyclic dicarboxylic acid (e.g. cyclopentane dicarboxylic acid) may also be used.

Specific examples of the aliphatic polyamide-based resin (C2) include polycapramide (nylon 6), poly-ω-aminoheptanoic acid (nylon 7), poly-ω-aminononanoic acid (nylon 9), polyundecanamide (nylon 11), polylauryl lactam (nylon 12) and a like homopolymers. Examples of copolyamide-based resin include polyethylenediamine adipamide (nylon 26), poly(tetramethylene adipamide) (nylon 46), poly(hexamethylene adipamide) (nylon 66), poly(hexamethylene sebacamide) (nylon 610), poly(hexamethylene dodecamide) (nylon 612), poly(octamethylene adipamide) (nylon 86), poly(decamethylene adipamide) (nylon 108), caprolactam/lauryl lactam copolymer (nylon 6/12), caprolactam/ω-aminononanoic acid copolymer (nylon 6/9), caprolactam/hexamethylene diammonium adipate copolymer (nylon 6/66), lauryl lactam/hexamethylene diammonium adipate copolymer (nylon 12/66), ethylenediamine adipamidethexamethylene diammonium adipate copolymer (nylon 26/66), caprolactam/hexamethylene diammonium adipate/hexamethylene diammonium sebacate copolymer (nylon 66/610), ethylene ammonium adipate/hexamethylene diammonium adipate-hexamethylene diammonium sebacate copolymer (nylon 6/66/610), and a like aliphatic copolyamide.

Since a relatively low number of carbon atoms contained in the aliphatic hydrocarbon unit of the main chain of the aliphatic polyamide-based resin can be expected to be effective for reducing odor. Nylon 6 is preferred.

The above-mentioned aromatic polyamide-based resin (C1) has a melting point of usually 220 to 270° C., preferably 220 to 250° C., as a value determined with a differential scanning calorimeter (DSC). Unduly high melting point may cause to deteriorate a quality of EVOH resin because of requiring a high temperature for molding. While unduly low melting point may cause to decrease thermal stability of the aromatic polyamide-based resin (C1).

The above-mentioned aliphatic polyamide-based resin (C2) has a melting point of usually 200 to 250° C., preferably 200 to 240° C. as a value determined with a differential scanning calorimeter (DSC). Unduly high melting point may cause to deteriorate a quality of EVOH resin because of requiring a high temperature for molding. While unduly low melting point tends to reduce compatibility with the EVOH resin.

Either or both of the polyamide-based resins (C1) and (C2) may be a terminal-modified polyamide resin which is modified at its carboxyl terminal or amine terminal. A carboxyl group reacts with the EVOH resin during melt molding to generate a gel or the like, resulting in poor appearance of a produced film. However, such defects can be reduced by a terminal modification.

A terminal-modified polyamide-based resin is a polyamide-based resin which is usually obtained by modifying carboxyl group of an unmodified polyamide-based resin with a terminal-adjusting agent for N-amide substitution. The terminal-modified polyamide-based resin normally has a modification rate of 5% or more by number of carboxyl groups based on the total number of carboxyl groups contained in the polyamide-based resin before modification. The terminal-modified polyamide-based resin can be produced, for example, by a method described in JP H08-19302B

[Content Ratio of (C1) to (C2)]

The component (C) contained in the resin composition is a combination of an aromatic polyamide resin (C1) and an aliphatic polyamide-based resin (C2), and the content ratio in weight, (C1)/(C2), is in the range of 55/45 to 99/1, preferably 65/35 to 90/10, particularly preferably 70/30 to 85/15. An amount of the aromatic polyamide-based resin (C1) is more than half of the component (C), which is a feature of the invention.

The aromatic polyamide-based resin (C1) can suppress the occurrence of offensive odor during melt molding of the resin composition.

The cause of offensive odor generated during melt molding of the resin composition is not ascertained. Such offensive odor does not occur in the case of a resin composition containing neither a polyamide-based resin nor hydrate-forming alkaline earth metal salt. The cause of the offensive odor is deduced that a polyamide-based resin might be decomposed by an interaction with the hydrate-forming metal salt under a high temperature condition such as melt molding, and the decomposition product might be cyclized to generate a cyclic compound as a cause of the odor.

The main chain of the aromatic polyamide-based resin is an aromatic group, and therefore an aromatic-containing monomer is generated as a decomposition product. The aromatic-containing monomer is not cyclized, and therefore would not generate offensive odor.

On the other hand, a tendency was found that a layer of a resin composition comprising the aromatic polyamide-based resin (C1) is more likely to elute in hot water sterilization as compared with a layer of a resin composition in which an aliphatic polyamide-based resin (C2) is blended with EVOH resin. The elution of EVOH resin may be prevented by forming a bond such as hydrogen bond between the EVOH resin and polyamide-based resin which is insoluble in hot water. An aromatic polyamide-based resin has poor compatibility with the EVOH resin and has a bulky aromatic structural unit which may become sterically hindered. Therefore the aromatic polyamide-based resin would has less potential in forming hydrogen bond with the EVOH resin or forming a network structure than the aliphatic polyamide.

In order to prevent both elution of EVOH resin during hot water sterilization treatment and generation of offensive odor during high temperature treatment such as melt molding, an aromatic polyamide and an aliphatic polyamide are used in combination. The decomposition of the aliphatic polyamide is caused by exposure to a high temperature, and probably generates the offensive odor. A resin composition is repeatedly exposed to high temperatures at the time of, for example, preparation of a resin composition, production of pellets for a molding material, melt kneading and melt molding by a user, and recycling operation of a multilayered structure containing the resin composition. The aliphatic polyamide would be decomposed whenever the resin composition is exposed to such a high temperature. Therefore if a content of the aliphatic polyamide resin contained in a resin composition is relatively high, the offensive odor may occur easily, as a result of the sequential processes under high temperatures. Melt molding and subsequent forming conducted by a user are examples of those sequential processes. For these reasons, the aliphatic polyamide-based resin is necessary in certain amounts to resin composition in order to prevent the elution of EVOH resin during hot water sterilization. In other words, only a sufficient amount of the aliphatic polyamide-based resin is enough to compatibilize the aromatic polyamide-based resin and EVOH resin for creating a bond between them.

From the viewpoint described above, more than half of the polyamide-based resin's amount is the aromatic polyamide-based resin (C1). In a preferred embodiment, the ratio in weight of the aromatic polyamide-based resin (C1) to the aliphatic polyamide-based resin (C2), (C1)/(C2), is in the range of 65/35 to 90/10, especially preferably 70/30 to 85/15.

The aliphatic polyamide-based resin (C2) may be blended to make a role of a compatibilizer between the aromatic polyamide-based resin (C1) and the EVOH resin (A), rather than a role of preventing the elution of EVOH resin (A).

The blend ratio can be determined based on an intense ratio of peaks in melting point of the resin composition which is measured by DSC.

According to the invention, the content ratio of the EVOH resin (A) to the polyamide-based resin (C). (A)/(C), is in the range of usually 99/1 to 70/30, preferably 97/3 to 75/25, particularly preferably 95/5 to 85/15. When the ratio of the polyamide-based resin is extremely large, long-run moldability and gas barrier performance tend to become insufficient. When the ratio of the polyamide-based resin is extremely low, suppressing the elution of the resin composition layer during a hot water sterilization tends to be insufficient.

The content ratio in weight of the hydrate-forming metal salt (B) to polyamide-based resin (C), (B)/(C), is in the range of usually 95/5 to 5/95, preferably 70/30 to 30/70, and particularly preferably 60/40 to 40/60, wherein the weight of (B) in the content ratio employs a weight of the completely dehydrated metal salt. When the ratio of the polyamide-based resin is extremely large, the gas barrier performance after the hot water sterilization treatment tends to be insufficient. When the ratio of the polyamide-based resin is extremely small, the EVOH resin is likely to be eluted during the hot water sterilization treatment.

[(D) Dispersant]

According to a preferable embodiment, the resin composition of the invention further contains a dispersant (D).

The dispersant (D) used in the invention is one conventionally used in a resin composition, for example, higher fatty acids having 16 to 30 carbon atoms. Specific examples of the dispersing agent include higher fatty acid (e.g. stearic acid, behenic acid, and oleic acid); metal salt (e.g. alkaline earth metal salt such as calcium salt and magnesium salt, aluminum salt, zinc salt, or barium salt) of higher fatty acid such as stearic acid and hydroxystearic acid; higher fatty acid ester (e.g. glyceride, methyl ester, isopropyl ester, butyl ester, or octyl ester of higher fatty acid), higher fatty acid amide (e.g. saturated aliphatic amide such as stearamide and behenamide, unsaturated fatty acid amide such as oleamide and erucamide, and bis-fatty acid amide such as ethylene bis stearamide, ethylene bis oleamide, ethylene bis erucamide, and ethylene bis lauramide). Preferably a higher fatty acid and/or its metal salt, ester and amide, and more preferably an alkaline earth metal salt of stearic acid and/or a higher fatty acid glycerin ester may be used.

A hydrate-forming metal salt (B) has a tendency to increase a torque value during kneading of the resin composition. Also the polyamide resin(C) has a tendency to increase the torque value during kneading of the EVOH resin. The dispersant (D) can suppress the increase in viscosity, and therefore the dispersant (D) is preferably added for long-run property in pellet production or extrusion molding of a film. The dispersant (D) may act as a lubricant for a hydrate-forming metal salt in the composition, thereby the resin composition can be significantly suppressed in viscosity increase.

For the dispersant (D), a higher fatty acid is preferred, a metal salt of a higher fatty acid is more preferred, metal salt of a higher fatty acid having 16 to 24 carbon atoms is further more preferred, alkaline earth metal salt of higher fatty acid having 16 to 20 carbon atoms is particularly preferred.

An alkaline earth metal salt of higher fatty acid used as a dispersant is distinct from hydrate-forming alkaline earth metal salt as the component (B) because the former is no longer hydrate-forming. That is to say, in the case of an alkaline earth metal salt which may have a form of hydrate, the alkaline earth metal salt already exists as its hydrate form when the alkaline earth metal salt is used as a dispersant.

The amount of the dispersant contained in the resin composition is preferably from 0.01 to 5 wt %, more preferably 0.1 to 5 wt %, and still more preferably 0.5 to 3 wt %, but not limited thereto.

The dispersant may be uniformly present in a pellet of the resin composition. Alternatively, the dispersant may be present on the surface of the pellet, which is obtained by adhering the dispersant to pellet after pelletization of the resin composition.

[Other Components]

The resin composition of the invention may contain a thermoplastic resin (hereinafter sometimes referred to as "other thermoplastic resins") at an amount of commonly 10 wt % or less relative to the EVOH resin (A)

Examples of the "other thermoplastic resin", include linear low-density polyethylene, low-density polyethylene, medium-density polyethylene, high-density polyethylene, ionomer, ethylene-propylene copolymer and copolymer of ethylene and α-olefin (having 4-20 carbon atoms) or a like polyethylenes; ethylene-acrylic acid ester copolymer; polypropylene, copolymer of propylene and α-olefin (having 4-20 carbon atoms) or a like polypropylenes; polyolefin-based resin such as polybutene, polypentene, or a polycyclic olefin, or a like polyolefin-based resin; polystyrene-based resin; polyester-based resin such as polyethylene terephthalate and polybutylene terephthalate; halogenated resin such as polyvinyl chloride, polyvinylidene chloride, chlorinated polyethylene, chlorinated polypropylene and the like; acrylic resin such as polymethylmethacrylate; polyester elastomers, polyurethane elastomer, and so on.

If necessary, a known additive may be further contained as long as the effect of the invention is not impaired. The amount of the additive within the range not impairing the effect is, for example, less than 5% by weight based on the entire resin composition. Examples of the additive include plasticizers such as aliphatic polyalcohols such as ethylene glycol, glycerin and hexanediol; lubricant such as saturated aliphatic amides (e.g. stearic acid amide), unsaturated fatty acid amides (e.g. oleic acid amide), bis fatty acid amide (e.g. ethylene-bis stearic acid amide); a low-molecular weight polyolefin (e.g. low molecular weight polyethylene or low molecular weight polypropylene both having a molecular weight of about 500-10,000); anti-blocking agent; antioxidant; colorant; antistatic agent; ultraviolet absorber; antibacterial agent; insoluble inorganic salt (e.g. hydrotalcite); filler; surfactant; wax; conjugated polyene compound; and enediol group-containing substance (e.g. phenols such as propyl gallate), aldehyde compounds (e.g. unsaturated aldehydes such as crotonaldehyde).

[Preparation of Resin Composition]

The EVOH resin (A), the hydrate-forming metal salt (B) and a polyamide-based resin (C) and optionally a dispersant (D) are mixed by melt kneading or mechanical mixing (dry blending) method, preferably by a melt kneading method.

The mixing order is not particularly limited. A mixed polyamide resin (C) is prepared in advance from polyamide-based resins (C1) and (C2), and may be added to the EVOH resin (A). Alternatively polyamide-based resins (C1) and (C2), and EVOH resin (A) are mixed together. If necessary, an excessive rate of hydrate-forming metal salt (B) is added to the EVOH resin (A) and/or the polyamide-based resin (C) to prepare a master batch, or the polyamide resin (C) is blended with the EVOH resin (A) in an excessive rate to prepare a composition having a high-concentration of the polyamide resin (C), and thereafter the high-concentration composition or master batch may be diluted with an EVOH resin to obtain a composition with a target composition.

For mixing them, any blending method such as dry blending with a banbury mixer, and melt-kneading with uniaxial or biaxial extruder, followed by pelletizing may be employed. The melt-mixing is carried out at a temperature of usually 150 to 300° C., preferably 170 to 250° C.

The resin composition of the invention which is prepared by melt-kneading raw materials may be directly supplied to a mold to produce a molded article. From the viewpoint of industrial handleability, a molded article is preferably produced by pelletizing the resin composition after melt-kneading raw materials and supplying the obtained pellets for the molded article. From the economic view, pellets obtained commonly by melt-kneading with an extruder is provided as a molding material.

<Melt-Molded Article>

The resin composition of the invention is formed into film, sheet, cup, bottle and so on through melt-molding. The melt-molding method includes extrusion molding process (T-die extrusion, tubular film extrusion, blow molding, melt spinning, contour extrusion etc.), injection molding process, and the like. The melt-molding temperature is selected from the range of usually 150 to 300° C.

A melt molded article made from the resin composition of the invention exhibits a superior gas barrier performance due to EVOH resin (A) as a main component. Therefore the melt molded article is preferably used as a packaging material for food or the like. In particular, a multilayered structure in which the resin composition of the invention is used as a gas barrier layer sandwiched by hydrophobic resin films, or laminated with a substrate for improving strength is preferably used as a packaging material.

<Multilayered Structure>

For the layer arrangement of the multilayered structure, an arbitrary combination such as a/b, b/a/b, a/b/a, a1/a2/b, a/b1/b2, b2/b1/a/b1/b2, and b2/b1/a/b/a/b1/b2 may be employed wherein "a" (for example, a1, a2, . . . ) denotes an inventive resin composition layer and "b" (for example, b1, b2, . . . ) denotes a substrate layer. A recycle layer is obtained by melting again waste edges or scraps generated in the production of a multilayered structure, and thereafter forming it into a film or sheet. Thus obtained recycle layer (R) comprises a mixture of thermoplastic resin and a resin composition of the invention, and therefore may be used for a layer in a multilayered structure such as b/R/a, b/R/a/b, b/R/a/R/b, b/a/R/a/b, or b/R/a/R/a/R/b wherein "R" denotes a layer of the recycled material. The total number of layers of the multilayered structure is in the range of usually 2 to 15, preferably 3 to 10. In the above layer arrangement, an adhesive resin layer may optionally be interposed individually between layers.

Examples of a substrate resin for the substrate resin layer b include polyolefin-based resin in a broad sense including polyethylene-based resins such as linear low density polyethylene, low density polyethylene, very low density polyethylene, medium density polyethylene, high density polyethylene, ethylene-propylene block- or random-copolymer, ethylene-α-olefin (having 4 to 20 carbon atoms) copolymer; polypropylene-based resins such as polypropylene, propylene-α-olefin (having 4 to 20 carbon atoms) copolymer, polybutene, polypentene, polycyclic olefin-based resin which has cyclic olefin structure in main chain and/or side chain, and other unmodified polyolefin-based resin, unsaturated carboxylic acid-modified polyolefin-based resin which is polyolefin graft-modified with unsaturated carboxylic acid or its ester, and other modified polyolefin-based resin; ionomer, ethylene-vinyl acetate copolymer, ethylene-acrylic acid copolymer, ethylene-acrylate copolymer, polyester-based resin, polyamide-based resin including copolyamide, polyvinyl chloride, polyvinylidene chloride, acryl-based resin, polystyrene, vinyl ester-based resin, polyester-based elastomer, polyurethane-based elastomer, polystyrene-based elastomer, halogenated polyolefin such as chlorinated polyethylene and chlorinated polypropylene, and aromatic or aliphatic polyketones.

A known adhesive resin is used for the adhesive resin and may be properly chosen depending on the type of the thermoplastic resin used for the substrate resin layer "b". A typical adhesive resin is a carboxyl group-containing modified polyolefin-based resin obtained by chemically bonding unsaturated carboxylic acid or its anhydride to polyolefin-based resin through addition reaction or grafting reaction. For example, maleic anhydride-graft modified polyethylene, maleic anhydride-graft modified polypropylene, maleic anhydride-graft modified ethylene-propylene block- or random-copolymer, maleic anhydride-graft modified ethylene-ethylacrylate copolymer, maleic anhydride-graft modified ethylene-vinyl acetate copolymer, maleic anhydride-modified polycyclic olefin-based resin, and maleic anhydride-graft modified polyolefin-based resin. These adhesive resin may be used alone or in a combination of two or more of them.

The substrate resin and the adhesive resin may contain plasticizer, filler, clay (e.g. montmorillonite), colorant, antioxidant, antistatic agent, lubricant, nucleating agent, antiblocking agent, ultraviolet absorber, wax, and other conventionally known additives in a content of the range without adversely affecting the gist of the invention, for example 30% by weight or less, preferably 10% by weight or less.

Laminating the inventive resin composition layer over the substrate resin layer, if necessary interposing adhesive resin layer between the inventive resin composition layer and the substrate resin layer, may be performed by a known method. Examples of the lamination processes include extruding substrate resin melt over a film or sheet of the resin composition; extruding the resin composition melt over a substrate resin layer; coextruding a resin composition and substrate resin; dry-laminating resin composition layer and substrate resin layer using a known adhesive such as organic titanium compound, isocyanate compound, polyester-based compound, or polyurethane compound; coating a solution of resin composition on a film or sheet of substrate resin, and then removing the solvent of the solution. Of these processes, coextrusion is preferably employed from the viewpoint of cost and environment.

Thus produced multilayered structure may be subjected to (thermal) stretching process if necessary.

After stretching process, heat setting may be conducted for providing the multilayered structure with dimensional stability. A conventional known technique for heat setting can be employed. For example, the stretched film is heat set at usually 80 to 180° C., preferably 100 to 165° C. in the period of usually 2 to 600 seconds with keeping a stretched condition.

Thus produced multilayered structure may be subjected to, if necessary, heat treatment, cooling treatment, rolling treatment, printing treatment, dry laminating, solution or molten coating treatment, bag making finish, deep drawing finish, box making finish, tube finish, split finish and a like fabrication.

A molded article including thus produced film and sheet, and molded articles made from stretched film such as bag, cup, tray, tube and bottle, are useful for packaging material for not only general food but also condiment such as mayonnaise, dressing, fermented food such as miso, oil and fat food such as salad oil, beverages, cosmetics, pharmaceuticals and so on.

Since the layer of the inventive resin composition sustains excellent gas barrier performance even after hot water sterilization treatment, the multilayered structure of the invention is particularly useful for a packaging material for food to be subjected to hot water sterilization.

The hot water sterilization treatment is a thermal treatment with use of hot water for sterilizing internal food or the like after being packaged. A package for food or the like is exposed to water (including steam) at 70-140° C. for 3-40 minutes in the treatment. The treatment temperature and the treatment time are set according to the kind of the internal food or the like. Some kind of bacteria is so durable as to be still living at 100° C., and therefore heat treatment with pressurizing is sometimes employed. Examples of the hot water sterilization treatment typically include boiling sterilization and retort sterilization.

A molded article or a multilayered structure made from a resin composition of the invention may be recycled. Even when the molded article or a multilayered structure is recycled, a problem associated with an offensive odor may be avoided. The resin composition is subjected to a thermal history involving repetitive melting which includes melt-kneading, pelletization, melt molding for film production and subsequently forming a multilayered structure, and remelting for recycling the molded article. Since the decomposition of polyamide-based resin is suppressed during processes including the exposure to heat, workers who handle the resin composition in the processes may be free from the offensive odor.

Since the heat resistance of the aromatic polyamide-based resin is superior to that of the aliphatic polyamide-based resin, the polyamide-based resin could sustain its effect even after repetitive heat treatments. Therefore, even the case that the resin composition is subject to repetitive hot water treatments, EVOH resin would be kept away from its elution.

EXAMPLES

Hereinafter, the present invention will be specifically described by way of examples. The present invention is not limited to the description of the embodiments unless the gist of the present invention is exceeded.

The term "part" in the example means a weight basis unless otherwise specified.

[Production of Resin Composition Nos. 1-5]

An ethylene-vinyl alcohol copolymer having 29 mol % of ethylene structural unit and MFR of 3.8 g/10 min. (210° C., load of 2160 g) was used as EVOH resin (A).

Trimagnesium dicitrate anhydride (from Jungbunzlauer) was used as a hydrate-forming metal salt (B), which had water absorption property shown below.

Water absorption property (I): $X_5/Y=0.9$
Water absorption property (II): $Z=50.1$ g Water absorption property (III): a local maximum point exists. (The water absorption at the sixth day is smaller than that of the fifth day.)

A MX nylon S6011 from Mitsubishi Gas Chemical Co., Ltd. was used as an aromatic polyamide-based resin (C1). The MX nylon (S6011) is a crystalline polyamide (water-insoluble, melting point of 237° C., content of aromatic structural unit: 50 mol %) obtained from meta-xylylenediamine and adipic acid. Nylon 6 (Novamid 1028 EN, produced by DSM) was used as an aliphatic polyamide-based resin (C2). The Nylon 6 has a melting point of 225° C.

Resin composition Nos. 1 through 5 were prepared. The resin compositions each contained 80 parts of an EVOH resin (A), 9.5 parts of a hydrate-forming metal salt (B), and 10 parts of polyamide resin (C), and 0.5 part of magnesium 12-hydroxystearate.

Resin composition Nos. 1 through 5 differed in a mixing ratio of aromatic polyamide resin (C1) to the aliphatic polyamide-based resin (C2) as shown in Table 1.

The preparation of the resin composition was conducted by blending the above components at a predetermined ratio, feeding the obtained mixture to a feeder, and then melt-kneading with a twin screw extruder having a diameter of 20 mm under the following conditions.

Conditions of the Extruder:
  Screw inner diameter: 20 mm
  L/D: 25
  Screw rotation number: 110 rpm
  Dice: two-hole strand die
  Extrusion temperature (° C.): C1/C2/C3/C4=180/240/240/240

Thus prepared EVOH resin composition was extruded into a strand-like shape and cut by a drum-type pelletizer to obtain cylindrical pellets. The pellet had a diameter of 1.1 mm and length of 3.2 mm. Thus produced pellets were evaluated with respect to odor and resistance to elution in hot water as follows. The evaluation results are shown in Table 1.

[Production of Resin Composition No. 6]

The resin composition No. 6 was prepared and formed into a cylindrical pellet in the same manner as No. 1 except that the amount of the EVOH resin (A) was 90 parts and the polyamide resin was not contained in the composition. The produced pellets were evaluated with respect to odor and resistance to elution in hot water as follows. The evaluation results are shown in Table 1.

[Odor]

The pellet produced above was melted again to form a new pellet, which was used for a recycled model pellet for the evaluation of odor.

The recycled model pellet represents a recycled article which has a severe thermal history in an actual recycling process, from a resin composition to a final product because the resin composition is subjected to repetitive heat exposure in the recycling process. Examining the recycled model pellet's odor is appropriate to assess whether the odor is significantly reduced.

(1) Production of Recycled Model Pellet

Blended were 5 parts of pellets of the resin composition, 90 parts of polypropylene (Novatec PP EA7AD [MFR 1.4 g/10 min. (under 230° C. and load of 2160 g) from Japan Polypropylene Corporation), 5 parts of an adhesive resin (Plexer PX6002 [MFR 2.7 g/10 min. (under 230° C. and load of 2160 g) from LyondellBasell), 4.2 parts of LDPE (Novatec LDLF320H [MFR 1.1 g/10 min. (under 190° C. and load of 2160 g) from Japan Polyethylene Corporation), 0.5 parts of ZHT-4A ($Mg_3ZnAl_2(OH)_{12}CO_3$ $mH_2O$/hydrotalcite solid solution), and 0.3 part of basic calcium stearate. The obtained mixture was melt-kneaded with a twin screw extruder shown below to prepare a recycled model pellet.

Conditions of the Extruder:
  Screw inner diameter: 20 mm
  L/D: 25
  Screw rotation number: 110 rpm
  Dice: two-hole strand die
  Extrusion temperature (° C.): C1/C2/C3/C4=180/240/240/240

(2) Evaluation of Odor

The evaluation was conducted by comparing in odor between a recycled model pellet produced above and a pellet of EVOH resin alone (reference example).

The reference pellet 5 g and recycled model pellet 5 g were charged in a glass bottle with lid and heated at 100° C. for 10 minutes in gear oven GPHH-200 (Espec Corp.).

Two samples of the reference pellet and one sample of the recycled model pellet were given to three panelists. Each panelist examined the odor of the given samples in random order, and chose the sample which had an offensive odor.

In the case where the sample for the recycled model pellet was chosen, the panelist noted the occurrence of offensive odor. In the case where the sample for the reference pellet or none was chosen, the recycled pellet was deemed as non-offensive. The recycled model pellet was evaluated using Ranks A through C. The ranks are based on the number of panelists who deemed the recycled model pellet's odor as offensive.

A: None of the panelists found the odor offensive
  B: Less than half of the panelists found the odor offensive
  C: More than half of the panelists found the odor offensive.

<Resistance to Elution in Hot Water>

Pellet of resin composition Nos. 1 through 5 and reference pellet were steam sterilized at 120° C. for 90 minutes with use of an automatic high-pressure steam sterilization apparatus (Autoclave SN200 from YAMATO), and thereafter being taken out from the apparatus. The condition of the pellet taken out was visually observed. In the case of ranks B and C described below, the pellets of the resin composition seems to have been dissolved by the treatment with the above-mentioned autoclave.

A: the pellet's outline was clearly visible
  B: the pellet form was still visible but edges became rounded
  C: the pellet lost its form

TABLE 1

| | No | 1 | 2 | 3 | 4 | 5 | 6 | Reference example |
|---|---|---|---|---|---|---|---|---|
| Composition | EVOH (A) | 80 | 80 | 80 | 80 | 80 | 90 | 100 |
| | Hydrate-forming metal salt (B) | 9.5 | 9.5 | 9.5 | 9.5 | 9.5 | 9.5 | 0 |
| | Aromatic polyamide-based resin (C1) | 10 | 8 | 5 | 2 | 0 | 0 | 0 |
| | Aliphatic polyamide-based resin (C2) | 0 | 2 | 5 | 8 | 10 | 0 | 0 |
| | Dispersant (D) | 0.5 | 0.5 | 0.5 | 0.5 | 0.5 | 0.5 | 0 |

TABLE 1-continued

| No | | 1 | 2 | 3 | 4 | 5 | 6 | Reference example |
|---|---|---|---|---|---|---|---|---|
| Evaluation | Resistance to elution in hot water | B | A | A | A | A | C | C |
| | Odor | A | A | B | C | C | A | A |

The composition No. 6 and reference example, both of which contain no polyamide-based resin, did not generate an offensive odor, however, had poor resistance to elution in hot water. Thus it is improper to apply hot water sterilization to them.

No. 5 was a resin composition in which an aliphatic polyamide resin (C2) alone was employed as the polyamide-based resin (C). No. 5 exhibited higher resistance to elution in hot water comparing with the reference example, however, No. 5 had a problem associated with offensive odor.

On the other hand, No. 1 was a resin composition in which an aromatic polyamide-based resin (C1) alone was employed as the polyamide-based resin (C). No. 1 did not have a problem associated with offensive odor caused from the addition of polyamide-based resin, however, the elution in hot water was observed. This means that the resistance to hot water sterilization would not be expected regardless of the addition of polyamide-based resin.

No. 2 was a resin composition in which a combination of an aromatic polyamide-based resin (C1) and an aliphatic polyamide resin (C2) was employed as a polyamide-based resin (C), and the mixing ratio of C1 to C2, C1/C2 was 8/2. As for No. 2, there was no offensive odor caused from the aliphatic polyamide-based resin (C2) and elution in hot water was suppressed.

While Nos. 3 and 4 were resin compositions each having a larger proportion of the aliphatic polyamide resin (C2) than the equivalent amount in the combination of an aromatic polyamide-based resin (C1) and an aliphatic polyamide resin (C2). As for Nos. 3 and 4, the resistance to elution in hot water was imparted by the addition of the polyamide, however, a problem associated with offensive odor was raised with an increase of the content ratio of the aliphatic polyamide.

It was understood from these results that employment of a combination of an aromatic polyamide-based resin (C1) and an aliphatic polyamide-based resin (C2) for the polyamide-based resin (C) as well as the excess amount of the aromatic polyamide (C2) in the combination are necessary in order to suppress the occurrence of offensive odor during hot water sterilization without impairing the resistance to elution in hot water due to the addition of polyamide resin.

[Production of Multilayered Structure]

Pellets of the resin composition Nos. 2 and 5 are supplied independently to an extruder equipped with a T-die set at 230° C. to form a three-kind five-layer multilayered film having a thickness of 320 μm.

The multilayered film was produced by coextruding under the condition as described below with use of a co-extruded multilayered film molding apparatus which was equipped with four-kind five-layer feed block, multilayered film molding die and a pull-up machine, and subsequently cooling by a chill roll in which cooling water circulated. The produced multilayered film has a layer arrangement of polypropylene ("Novatec PP EA7AD" from Japan Polypropylene Corporation)/adhesive resin (Plexar PX6002, manufactured by LyondeBasell)/resin composition of the invention/adhesive resin/polypropylene with thickness (μm) of 120/20/40/20/120.

Intermediate layer extruder (EVOH): 32 mmφ-single screw extruder (barrel temperature: 230° C.)
Upper-layer extruder (PP): 40 mmφ-single-screw extruder (barrel temperature: 230° C.)
Lower layer extruder (PP): 40 mmφ-single screw extruder (barrel temperature: 230° C.)
Outer Inside layer extruder (adhesive resin): 32 mmφ-single screw extruder (barrel temperature: 230° C.)
Die: a four-kind five-layer type feed block die (die temperature: 230° C.)
Temperature of cooling roll: 80° C.

[Gas Barrier Performance after Hot Water Sterilization Treatment]

Two sample pieces (10 cm×10 cm) of the multilayered structure 2S and 5S, which were made from the pellet of resin composition No. 2 and No. 5 respectively, were subjected to hot water sterilization at 123° C. for 33 minutes with use of a hot water immersion type retort apparatus (HISAKA WORKS, Ltd.). The samples 1 day after the hot water sterilization treatment were examined with respect to oxygen gas permeability (23° C., relative humidity of 90% (inside) and 50% (outside)) with use of oxygen gas permeation measuring apparatus (OX-TRAN 2/21, manufactured by MOCON Co., Ltd.).

The oxygen permeation rate of 2S was 7.2 cc/m$^2$·days·atm, and the oxygen permeation rate of 5S was 11.7 cc/m$^2$·days·atm. It was confirmed that these multilayered structures still sustained excellent gas barrier performance even after the hot water sterilization treatment.

INDUSTRIAL APPLICABILITY

A resin composition of the invention is free from the problem associated with offensive odor when being melt molded, as well as being melt molded for recycling the resin composition. Moreover a multilayered structure comprising a layer of the resin composition can be suppressed to eluted the EVOH resin therefrom and deteriorate the gas barrier performance during the hot water sterilization treatment. Therefore the resin composition is extremely useful in industry.

What is claimed is:

1. A resin composition comprising an ethylene-vinyl alcohol copolymer (A), a hydrate-forming metal salt (B), and a polyamide-based resin (C), in which (A), (B), and (C) are mixed together,
wherein a weight ratio of the ethylene-vinyl alcohol copolymer (A) to the polyamide-based resin (C), (A)/(C), is from 99/1 to 70/30,
wherein the polyamide-based resin (C) includes
an aromatic polyamide-based resin (C1) whose main chain includes a structural unit containing an aromatic ring and aliphatic polyamide-based resin (C2) whose main chain includes an aliphatic hydrocarbon containing 5 or more carbon atoms,
wherein a weight ratio of the aromatic polyamide-based resin (C1) to the aliphatic polyamide-based resin (C2), (C1)/(C2), is from 55/45 to 99/1, and wherein the aromatic-polyamide-based resin (C1) is a copolymer of meta-xylylenediamine and adipic acid, and the aliphatic polyamide-based resin (C2) is nylon 6.

2. The resin composition according to claim 1, wherein a content of the structural unit having an aromatic ring in the aromatic-polyamide resin (C1) is from 30 to 60 mol %.

3. The resin composition according to claim 1, wherein the hydrate-forming metal salt (B) satisfies at least one of water absorption properties (I), (II), or (III):

water absorption property (I): a ratio ($X_5/Y$) is 0.2 or more wherein Y is an amount of water of crystallization in hydrated hydrate-forming metal salt (B) in a state of maximum hydration, and $X_5$ is an amount of water absorption when the hydrate-forming metal salt (B) is placed for 5 days under the condition of 40° C. and 90% relative humidity;

water absorption property (II): an amount (Z) of water absorbed per 100 g of the hydrate-forming metal salt (B) while the hydrate-forming metal salt (B) is placed for 24 hours under the condition of 40° C. and 90% relative humidity, is 10 g or more;

water absorption property (III): a local maximum point exists in an amount of water absorption when the hydrate-forming metal salt (B) is placed under the condition of 40° C. and 90% relative humidity.

4. The resin composition according to claim 3, wherein the hydrate-forming metal salt (B) satisfies the water absorption properties (I), (II), and (III).

5. The resin composition according to claim 2, wherein the hydrate-forming metal salt (B) satisfies the water absorption properties (I), (II), and (III):

water absorption property (I): a ratio ($X_5/Y$) is 0.2 or more wherein Y is an amount of water of crystallization in hydrated hydrate-forming metal salt (B) in a state of maximum hydration, and $X_5$ is an amount of water absorption when the hydrate-forming metal salt (B) is placed for 5 days under the condition of 40° C. and 90% relative humidity;

water absorption property (II): an amount (Z) of water absorbed per 100 g of the hydrate-forming metal salt (B) while the hydrate-forming metal salt (B) is placed for 24 hours under the condition of 40° C. and 90% relative humidity, is 10 g or more;

water absorption property (III): a local maximum point exists in an amount of water absorption when the hydrate-forming metal salt (B) is placed under the condition of 40° C. and 90% relative humidity.

6. The resin composition according to claim 1, further comprising a dispersant (D).

7. A multilayered structure comprising at least one layer comprising the resin composition according to claim 1.

8. A method for suppressing an occurrence of offensive odor of a multilayered structure on exposure to heating, the method comprising:

providing a multilayered structure containing a gas barrier layer made of a resin composition comprising an ethylene-vinyl alcohol copolymer (A), a hydrate-forming metal salt (B), and a polyamide-based resin (C), mixed together, wherein a content ratio of the ethylene-vinyl alcohol copolymer (A) to the polyamide-based resin (C), (A)/(C), is from 99/1 to 70/30, wherein the polyamide-based resin (C) employs a combination of an aromatic polyamide-based resin (C1) whose main chain includes a structural unit containing an aromatic ring, and an aliphatic polyamide-based resin (C2) whose main chain includes an aliphatic hydrocarbon containing 5 or more carbon atoms, and wherein a weight ratio of the aromatic polyamide-based resin (C1) to the aliphatic polyamide-based resin (C2), (C1)/(C2), is from 55/45 to 99/1 wherein the aromatic-polyamide-based resin (C1) is a copolymer of meta-xylylenediamine and adipic acid, and wherein the aliphatic polyamide-based resin (C2) is nylon 6; and heating the multilayered structure.

* * * * *